(12) United States Patent
Faragher

(10) Patent No.: US 9,261,579 B2
(45) Date of Patent: Feb. 16, 2016

(54) RADIO POSITIONING OF A MOBILE RECEIVER USING A VIRTUAL POSITIONING REFERENCE

(75) Inventor: Ramsey Michael Faragher, Huyton (GB)

(73) Assignee: BAE SYSTEMS PLC, London (GB)

( * ) Notice: Subject to any disclaimer, the term of this patent is extended or adjusted under 35 U.S.C. 154(b) by 767 days.

(21) Appl. No.: 13/500,016

(22) PCT Filed: Oct. 4, 2010

(86) PCT No.: PCT/GB2010/051654
§ 371 (c)(1),
(2), (4) Date: Apr. 3, 2012

(87) PCT Pub. No.: WO2011/042726
PCT Pub. Date: Apr. 14, 2011

(65) Prior Publication Data
US 2012/0194389 A1   Aug. 2, 2012

(30) Foreign Application Priority Data

| Oct. 5, 2009 | (EP) | 09275091 |
| Oct. 5, 2009 | (EP) | 09275092 |
| Oct. 5, 2009 | (GB) | 0917384.0 |
| Oct. 5, 2009 | (GB) | 0917388.1 |
| Nov. 27, 2009 | (EP) | 09177349 |
| Nov. 27, 2009 | (GB) | 0920772.1 |
| Jun. 7, 2010 | (EP) | 10275059 |
| Jun. 7, 2010 | (GB) | 1009486.0 |
| Aug. 10, 2010 | (GB) | 1013413.8 |

(51) Int. Cl.
*G01S 1/24* (2006.01)
*G01S 5/10* (2006.01)
(Continued)

(52) U.S. Cl.
CPC ... *G01S 5/10* (2013.01); *G01S 5/02* (2013.01); *G01S 5/08* (2013.01)

(58) Field of Classification Search
CPC ............ G01S 5/021; G01S 5/10; G01S 11/08
USPC .......................................... 342/387, 458, 464
See application file for complete search history.

(56) References Cited

U.S. PATENT DOCUMENTS

| 4,024,383 A * | 5/1977 | Beasley ........................ 701/493 |
| 5,045,861 A | 9/1991 | Duffett-Smith |

(Continued)

FOREIGN PATENT DOCUMENTS

| DE | 101 11 967 A1 | 10/2001 |
| EP | 0 303 371 A1 | 2/1989 |

(Continued)

OTHER PUBLICATIONS

Blewitt, Basics of the GPS Technique: Observation Equations, 1997.*

(Continued)

*Primary Examiner* — Frank J McGue
(74) *Attorney, Agent, or Firm* — Maine Cernota & Rardin

(57) ABSTRACT

Methods and systems are disclosed for radio positioning of a mobile receiver using a virtual positioning reference established by logging a known position of the mobile receiver together with a local time at which a first instance of a predictably repeated code word is received by the mobile receiver from a terrestrial radio signal transmitter. During movement of the mobile receiver from the first known position to a second unknown position, a local clock is used to determine the time difference between when the virtual positioning reference is predicted to receive a second instance of the code word and when the mobile receiver actually receives the second instance of the code word.

16 Claims, 5 Drawing Sheets

(51) Int. Cl.
*G01S 5/02* (2010.01)
*G01S 3/02* (2006.01)
*G01S 5/08* (2006.01)

(56) References Cited

U.S. PATENT DOCUMENTS

| | | | |
|---|---|---|---|
| 5,502,450 A | | 3/1996 | Zablotney et al. |
| 5,982,324 A | * | 11/1999 | Watters et al. ............ 342/357.29 |
| 6,100,845 A | | 8/2000 | Rose |
| 6,445,927 B1 | | 9/2002 | King et al. |
| 6,490,454 B1 | * | 12/2002 | Kangas et al. ............... 455/456.1 |
| 6,529,165 B1 | * | 3/2003 | Duffett-Smith et al. ....... 342/463 |
| 6,567,669 B1 | | 5/2003 | Groome |
| 6,868,073 B1 | | 3/2005 | Carrender |
| 6,876,325 B1 | | 4/2005 | Coluzzi et al. |
| 7,228,139 B1 | | 6/2007 | Wortham |
| 7,388,541 B1 | * | 6/2008 | Yang ............................ 342/464 |
| 7,471,241 B1 | | 12/2008 | Yang |
| 7,940,210 B2 | * | 5/2011 | Fly et al. ................... 342/357.24 |
| 8,072,383 B1 | * | 12/2011 | Martin et al. .................. 342/387 |
| 2001/0022558 A1 | | 9/2001 | Karr et al. |
| 2002/0126046 A1 | | 9/2002 | Counselman, III et al. |
| 2003/0022675 A1 | | 1/2003 | Mergler |
| 2003/0048731 A1 | | 3/2003 | Ozaki et al. |
| 2003/0125046 A1 | | 7/2003 | Riley et al. |
| 2003/0125875 A1 | | 7/2003 | Lee |
| 2003/0176196 A1 | | 9/2003 | Hall et al. |
| 2003/0222820 A1 | | 12/2003 | Karr et al. |
| 2004/0102198 A1 | | 5/2004 | Diener et al. |
| 2004/0242234 A1 | | 12/2004 | Klenner |
| 2005/0184907 A1 | | 8/2005 | Hall et al. |
| 2005/0288033 A1 | | 12/2005 | McNew et al. |
| 2006/0181454 A1 | | 8/2006 | Nichols |
| 2006/0211430 A1 | | 9/2006 | Persico |
| 2008/0032706 A1 | | 2/2008 | Sheynblat et al. |
| 2008/0113672 A1 | | 5/2008 | Karr et al. |
| 2008/0167049 A1 | | 7/2008 | Karr et al. |
| 2008/0234930 A1 | | 9/2008 | Cheok et al. |
| 2008/0242310 A1 | | 10/2008 | Vassilovski |
| 2009/0115658 A1 | | 5/2009 | Zimmerman et al. |
| 2009/0156229 A1 | | 6/2009 | Hein et al. |

FOREIGN PATENT DOCUMENTS

| | | | |
|---|---|---|---|
| EP | 0 437 822 A2 | | 7/1991 |
| EP | 1 271 178 A2 | | 1/2003 |
| EP | 1 361 773 A1 | | 11/2003 |
| EP | 1 942 351 A1 | | 7/2008 |
| GB | 1013413 A | | 12/1965 |
| GB | 2 254 508 A | | 10/1992 |
| GB | 2 359 699 A | | 8/2001 |
| GB | 2 380 793 A | | 4/2003 |
| JP | 58-200179 A | | 11/1983 |
| JP | 2009-300146 A | | 12/2009 |
| WO | WO 02/09107 A2 | | 1/2002 |
| WO | WO 02/23215 A1 | | 3/2002 |
| WO | WO 02/33435 A2 | | 4/2002 |
| WO | WO 02/069507 A2 | | 9/2002 |
| WO | WO 03/008990 A2 | | 1/2003 |
| WO | WO 03/010552 A2 | | 2/2003 |
| WO | WO 03/058985 A2 | | 7/2003 |
| WO | WO 2004/074779 A1 | | 9/2004 |
| WO | WO 2006/099632 A2 | | 9/2006 |
| WO | WO 2007/001660 A2 | | 1/2007 |
| WO | WO 2008/116168 A1 | | 9/2008 |
| WO | WO 2008/118621 A1 | | 10/2008 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051654. (11 Pages).
Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051657. (10 Pages).
Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051653. (10 Pages).
Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051655. (11 Pages).
International Search Report (PCT/ISA/210) issued on Mar. 22, 2011, by British Patent Office as the International Searching Authority for International Application No. PCT/GB2010/051654.
International Search Report (PCT/ISA/210) issued on Feb. 1, 2011, by British Patent Office as the International Searching Authority for International Application No. PCT/GB2010/051657.
International Search Report (PCT/ISA/210) issued on Jul. 7, 2011, by British Patent Office as the International Searching Authority for International Application No. PCT/GB2010/051653.
Written Opinion isssued on Jul. 7, 2011, by European Patent Office for Application No. PCT/GB210/051653.
International Search Report (PCT/ISA/210) issued on Oct. 19, 2011, by British Patent Office as the International Searching Authority for International Application No. PCT/GB2010/051655.
Search Report issued on Mar. 15, 2010, by European Patent Office for Application No. 09275091.8.
Search Report issued on Feb. 5, 2010, by British Patent Office for Application No. 0917384.0.
Search Report issued on Mar. 8, 2010, by British Patent Office for Application No. 0917388.1.
Search Report issued on Apr. 26, 2010, by European Patent Office for Application No. 09275092.6.
Search Report issued on Dec. 17, 2010, by British Patent Office for Application No. 1013413.8.
Search Report issued on Oct. 7, 2010, by British Patent Office for Application No. 1009486.0.
Search Report issued on Feb. 23, 2011, by European Patent Office for Application No. 10275059.3.
Search Report issued on Mar. 24, 2010, by British Patent Office for Application No. 0920772.1.
Search Report issued on Oct. 6, 2010, by European Patent Office for Application No. 09177349.9.
Particle Filter from Wikipedia, XP-002628464, Aug. 23, 2005, pp. 1-3.
Yang et al., "Self-Calibrating Position Location Using Signals of Opportunity", XP007917393, Sep. 2009, pp. 1055-1063.

* cited by examiner

RADIO POSITIONING OF A MOBILE RECEIVER USING A VIRTUAL POSITIONING REFERENCE

FIELD OF THE INVENTION

The present invention relates to a method and system for radio positioning of a mobile receiver by using a virtual positioning reference. The method and system can advantageously utilise radio signals originating from terrestrial unsynchronised radio transmitters, for example, television, cellular, wi-fi, public radio and the like.

BACKGROUND TO THE INVENTION

A commonly used resource for outdoor navigation is satellite positioning technology, otherwise known as a Global Navigation Satellite System (GNSS). One example of a fully operational GNSS is the United States NAVSTAR Global Positioning System (GPS)—which will be referred to below when generally discussing satellite positioning technology. However, it will be appreciated that satellite positioning technologies other than GPS may be used in its place.

The operation of GPS is well known in the art, and generally employs a GPS receiver arranged to receive signals from a number of GPS satellites. Each satellite broadcasts its own location and providing the GPS receiver can receive the broadcasted signals from a sufficient number and distribution of satellites, the GPS receiver can infer its own position.

An entity wanting to self-localise may therefore employ a positioning system having a GPS receiver. However, in the event that a GPS receiver is not able to infer its position—for example due to signal interference, then it may be possible for the positioning system to make use of other positioning resources.

For example, a navigation system can navigate using radio signals transmitted by terrestrial radio transmitters such as cellular telephone base stations, television and the like. The signals transmitted by such radio transmitters have distinguishing radio signal characteristics—such as repeated and unique code words—that can be exploited by a suitable positioning system for navigation. These radio signal characteristics along with information about the location the transmitters can be used to determine the position of an entity using known localisation techniques such as multilateration and Enhanced Observed Time Difference (EOTD) as is known in the art.

The regular or otherwise predictably repeated code words are used to allow the receiver of those signals to synchronise with the transmitter. Once synchronised with a set of transmitters, a receiver can therefore determine the relative arrival times of the code words from the available set. As the receiver moves and this set of relative times varies, the receiver can determine its position accordingly. This process is relatively straightforward for transmitters that are synchronised with one another (as is the case with GPS).

However, terrestrial radio signal transmitters that are available to a receiver are not usually synchronised—even if they are set up to transmit the same radio signal type, with the same code word repeat rate. For radio signal transmitters of different types (e.g. different bandwidths and/or frequencies)—e.g. a cellular transmitter versus a DAB transmitter—synchronisation is highly improbable.

As can be observed from a navigation system such a GPS, synchronisation between the radio signal sources is very useful for radio localisation—but is often not possible in an environment in which opportunistic unsynchronised terrestrial radio signals are the only radio signal sources available for localisation.

One known solution in the art is to compensate for the lack of synchronisation by calculating clock offsets (relative to an imaginary universal 'absolute' clock) for each transmitter and storing these values for use as clock corrections. In particular, a navigation system can make use of the following Equation 1 to calculate transmitter clock offsets for use in 'emulating' synchronicity:

$$ct = |r-b| + \epsilon + \alpha \qquad \text{Equation 1}$$

where:
c is the known speed of the radio waves;
t represents the arrival time (measured at the receiver position using a clock local to the mobile receiver) of a transmission from a transmitter;
r and b are vectors of the positions of the receiver and transmitter respectively. For example, each vector could be the "x, y" values in an 2D Cartesian environment;
$\epsilon$ represents the error of the clock local to the mobile receiver, and;
$\alpha$ represents the transmitter clock offset.

Prior art navigations systems that attempt to make use of unsynchronised radio transmitters for navigation can therefore calculate the transmitter clock offset $\alpha$ and local clock error $\epsilon$ via the mobile receiver collecting timing measurements at a number of different known mobile receiver positions relative to a stationary transmitter having a known location.

However, the calculation of the transmitter clock offset $\alpha$ and local clock error $\epsilon$ values can be computationally expensive, especially when considering that multiple transmitters are required for effective self-localisation. This is especially the case in a system that has the capability of dealing with imperfect data (for example by applying a localisation estimation filter). In such a case, a state vector will need to be maintained including and calculating the offset values for every transmitter, and the errors/uncertainties associated with them.

Furthermore, if a relatively cheap and simple navigation device is employed, the local onboard clock is not likely to be stable. Therefore, the calculated value of a local clock error at one instance does not necessarily apply at another instance, adversely affecting the position calculation. Therefore, it would be beneficial to negate the effect of local clock error.

Whilst it is possible to obtain a highly stable clock reference using atomic clock references, or via a GPS fix, these are not necessarily practical solutions. Atomic clock references are heavy, expensive and unsuitable for a portable navigation device. A stable timing reference can be obtained via GPS, but this relies on a continuous GPS fix, and so is not possible under conditions in which a GPS signal cannot be obtained.

It is possible to formulate a local clock error model with which an attempt can be made to compensate for the likely error in an unstable local clock. However, the model needs to be calculated/calibrated for the eccentricities of each local clock independently and updated over time. To do this is computationally expensive, and so undesirable in a portable system in which processing power and battery life are valuable resources.

These are problems associated with the prior art devices that make use of the above Equation 1. Accordingly, it may be desirable to provide a relatively cheap, portable navigation device able to utilise terrestrial radio signal transmitters for self-localisation in the event that a GPS signal cannot be obtained. To save on battery usage and overall weight, it may also be desirable to reduce the computational burden involved with self-localisation of such a device beyond those making use of the above Equation 1.

SUMMARY

According to a first aspect of the present invention there is provided a method for radio positioning of a mobile receiver comprising:
- when the mobile receiver is at a first known position, establishing a virtual positioning reference by logging the known position of the mobile receiver together with a local time at which a first instance of a predictably repeated code word is received by the mobile receiver from a terrestrial radio signal transmitter having a known position, the local time being measured relative to a clock local to the mobile device;
- running the local clock during movement of the mobile receiver from the first known position to a second unknown position; and
- when the mobile receiver is at the second unknown position, using the local clock in determining the time difference between when the virtual positioning reference is predicted to receive a second instance of the code word and when the mobile receiver actually receives the second instance of the code word, and thereby determining the position of the mobile receiver.

Such a method exploits the clock stability of the transmitter from which a virtual positioning reference is established. The clock offset associated with the transmitter will not change over the time during which the mobile receiver is moving between the first and second position. Assuming a stable transmitter clock, it is possible to relieve the mobile receiver from the computational burden of needing to calculate the transmitter clock offset. This value is simply eliminated during the step of determining the time difference between when the virtual positioning reference is predicted to receive the second instance of the code word and when the mobile receiver actually receives the second instance of the code word. In other words, because a differential method is used for determining the position of the mobile receiver, it is not necessary to calculate the transmitter clock offset. This will only be valid if the transmitter clocks exhibit high levels of stability since the creation of the most recent virtual positioning reference. Modern digital opportunistic signal sources such as cellular, DAB, DVB, etc transmissions exhibit such high stabilities and would allow such a method to be utilised for many hours after establishing a virtual reference.

For the avoidance of doubt, it will be understood that the determined time difference is associated with the change in position of the mobile receiver from the first position to the second position relative to the transmitter.

The present invention is applicable to radio positioning using radio signals of opportunity—i.e. those which may not have been previously encountered, or at least have initially unknown characteristics. Therefore, the mobile receiver, when at the first known position, may establish a profile of any initially unknown radio signal. For example, the profile may comprise identifying characteristics of the radio signal such as specific code words that allow a confident association with the radio signal with a particular transmitter. Furthermore, the method may comprise determining the repeat rate of the terrestrial radio signal transmitter to predict when the virtual positioning reference will receive a second instance of the code word. As mentioned, characteristics such as the code word repeat rate may be determined by analysing the radio signal originating from the transmitter.

The method may comprise deriving the position of the mobile receiver at the first known position via a primary positioning resource, such as a GPS receiver, local to the mobile receiver. The second unknown position may be at a position at which the primary positioning resource of the mobile receiver is rendered ineffective.

Such use of a primary positioning resource such as a GPS receiver allows the mobile receiver to confidently determine an initial first position. Where a GPS receiver is the primary positioning resource, this is when the GPS receiver is able to receive GPS signals from a sufficient number of satellites. Under certain conditions, for example when the mobile receiver is operating under foliage, indoors or otherwise in environments where the GPS signal is subject to interference, the mobile receiver can then fall back on to radio positioning using terrestrial radio signals.

It will be noted that such radio signals are generally not set up specifically to allow navigation, and so can be difficult to utilise over the long term. For example, terrestrial transmitters in a given geographical area tend not to be of the same type (e.g. of different frequencies, signal structures, and bandwidths) and are not synchronised with one another. Thus, GPS may be used as the primary positioning resource to self-localise whenever possible, the secondary terrestrial-transmitter-based radio-localisation only taking effect for the short periods for which the primary positioning resource is rendered ineffective.

The method may comprise calculating the time difference using a differential positioning module local to the mobile receiver. The differential positioning module may be arranged to calculate differential corrections relative to real/actual reference base stations.

The same differential positioning module can be used in conjunction with both virtual positioning references and real reference base stations. This is useful because the mobile receiver may be able to receive information from a real reference base station and use this to localise and/or improve localisation. In doing so, the calculations necessary can be performed through the same differential positioning module, reducing the complexity of the mobile receiver. In practice, if the differential calculation module is implemented in hardware, the reduced physical circuitry ('silicon real estate') can increase the portability of the mobile device. Potentially, this may also reduce the computational burden on a general-purpose processor of the mobile receiver.

Such a method can be used with current systems that require a real reference receiver to bridge any gaps caused by communication drop out. The moving receiver, on losing contact with the reference receiver, can generate the expected measurements from the reference and carry on using the same positioning algorithms, filters and processes until communication with the real reference is established. This method will tend to provide the highest level of accuracy if the communications drop outs are short enough such that the transmitter clocks remain highly stable during the communication dropout period.

The method may comprise establishing a plurality of virtual positioning references at known locations spaced from one another. This may improve the determination of the location of the mobile receiver. For example, the effect of multipath interference is reduced with an increased number of virtual positioning references due to low likelihood of the same multipath error occurring at every spaced reference position.

The method may comprise the mobile receiver receiving transmissions from a plurality of geographically spaced terrestrial transmitters, each transmitter transmitting predictably repeated code words that are distinguishable from one another.

The ability of the mobile receiver to self localise is improved with a greater number of transmitters that are geographically spaced from one another.

The method may comprise capturing radio signal data using a radio signal capture window the length of which is limited to substantially the length of time of the most slowly repeating code word repeat rate.

By limiting the radio signal capture window, the amount of data that the mobile receiver will need to log is reduced. The capture length limit is defined by the minimum time in which it is possible to guarantee that a code word will be received from a transmitter.

The method may comprise predicting when a code-word from a given transmitter is expected to arrive at the mobile receiver, and opening a radio signal capture window at substantially this time. The radio signal capture window may be opened for substantially the time period to receive the code word. This reduces the amount of superfluous data captured.

The method may comprise applying the equation:

$$c(t_{new} - t_{ref}) = |r_{new} - b| - |r_{ref} - b| + (\alpha - \alpha) + (\epsilon_{new} - \epsilon_{ref})$$

where:
c is the known speed of the radio waves;
$t_{new}$ represents the time, measured at the mobile receiver using the local clock, at which the second instance of the code word is received by the mobile receiver at the second position;
$t_{ref}$ represents the time, measured at the mobile receiver using the local clock, at which the virtual positioning reference is predicted to receive the second instance of the code word;
$r_{new}$ is the new (second unknown) position of the mobile receiver;
b is the position of the stationary transmitter;
$r_{ref}$ is the reference (first known) position of the mobile receiver;
$\alpha$ represents the transmitter clock offset;
$\epsilon_{ref}$ represents the error of the clock local when the reference measurements ($t_{ref}$) were established; and
$\epsilon_{new}$ represents the error of the clock local to the mobile receiver.

Clock errors tend to be removed by this virtual position reference technique as long as the transmitter clock offset values a are stable during the time period over which the mobile receiver is moving between the first known position and the second unknown position.

In effect the measurements expected at the first position at the new moment in time are calculated (and are an estimate of the measurements that would have been made if the mobile receiver had stayed at that original first position). This calculation is possible because the repeat rate of the transmitter's code word is known and its transmitter reference is highly stable. The receiver's motion relative to the starting point and the transmitter can be inferred immediately by taking the difference in the times of arrival of the real second measurement and the estimated measurement from the virtual positioning reference.

The mobile receiver may receive transmissions from a plurality of transmitters.

This allows a 'single difference' calculation to be performed to remove any effect of a local clock error. Thus it is not necessarily required to undertake the computationally burdensome task of establishing a local clock error model.

The single different calculation, can be determined by taking the differences between pairs of measurements from different transmitters. This leaves the effects of multipath interference, signal geometry and measurement noise as the main sources of error.

An example of a single-difference measurement between pairs of transmitter measurements is shown as follows:

$$C(t^A_{new} - t^A_{ref}) - c(t^B_{new} - t^B_{ref}) = (|r_{new} - b^A| - |r_{ref} - b^A| + (\epsilon_{new} - \epsilon_{ref})) - (|r_{new} - b^B| - |r_{ref} - b^B| + (\epsilon_{new} - \epsilon_{re}))$$

As can be seen, local clock errors can thus be removed. Assuming no other available data, the minimum number of transmitters required for a two-dimensional position estimate is three, and the minimum number of transmitters required for a three-dimensional position estimate is four.

For the avoidance of doubt, the value of $t_{ref}$ can be determined by adding a multiple of the repeat rate of the code word transmission to the original time at which the first instance of the code word was measured by the mobile receiver at the first position. More particularly:

$$t_{ref} = t_{start} + N \cdot P$$

where $t_{start}$ is the time at which the first instance of the code word is received by the mobile receiver at the first position, P is the period between transmitter code-word broadcasts to a perfect clock, N is the number of transmitter code words expected to have been broadcast since the first timing measurement $t_{start}$.

According to a second aspect of the present invention there is provided a method for radio positioning of a mobile receiver comprising:
receiving at the mobile receiver and logging, for use as a virtual positioning reference, first timing information from a transmitter when the mobile receiver is at a first known position;
moving the mobile receiver from the first known position to a second unknown position;
receiving second timing information from the transmitter at the mobile receiver when the mobile receiver is at the second unknown position; and
comparing the second timing information against the virtual positioning reference by differencing the first and second timing information to calculate the position of the mobile receiver.

Timing information may comprise the time, relative to a clock local to the mobile device, at which a radio signal timing characteristic—such as a predictably repeated code word—is received by the mobile receiver from the transmitter.

The local clock may be run between movement of the mobile receiver between the first and second positions to measure the time interval between the reception of the first and second timing information.

The transmitter may be terrestrial and stationary and/or may have a position that is known or determinable by the mobile receiver.

The first known position of the mobile receiver may be provided by a satellite positioning receiver, such as a GPS receiver, local to the mobile receiver. The second unknown position may be at a position at which the mobile receiver is denied GPS signals.

According to a third aspect of the present invention there is provided a mobile receiver and/or navigation system arranged to carry out the method according to any one of the first and/or second aspects of the invention.

According to a fourth aspect of the present invention there is provided a carrier medium for carrying a computer readable code arranged control a computing device to carry out the method according to any one of the first and/or second aspects of the invention.

According to a fifth aspect of the present invention there is provided a mobile receiver arranged to self localise using radio positioning by:
- when the mobile receiver is at a first known position, establishing a virtual positioning reference by logging the known position of the mobile receiver together with a local time at which a first instance of a predictably repeated code word is received by the mobile receiver from a terrestrial radio signal transmitter having a known position, the local time being measured relative to a clock local to the mobile device;
- running the local clock during movement of the mobile receiver from the first known position to a second unknown position; and
- when the mobile receiver is at the second unknown position, using the local clock in determining the time difference between when the virtual positioning reference is predicted to receive a second instance of the code word and when the mobile receiver actually receives the second instance of the code word, and thereby determining the position of the mobile receiver.

It will be understood that different aspects of the present invention may be combined where the context allows.

BRIEF DESCRIPTION OF THE FIGURES

Embodiments of the present invention will now be described, by way of example only, with reference to the accompanying drawings in which.

DETAILED DESCRIPTION OF THE PREFERRED EMBODIMENT

Figure 1:
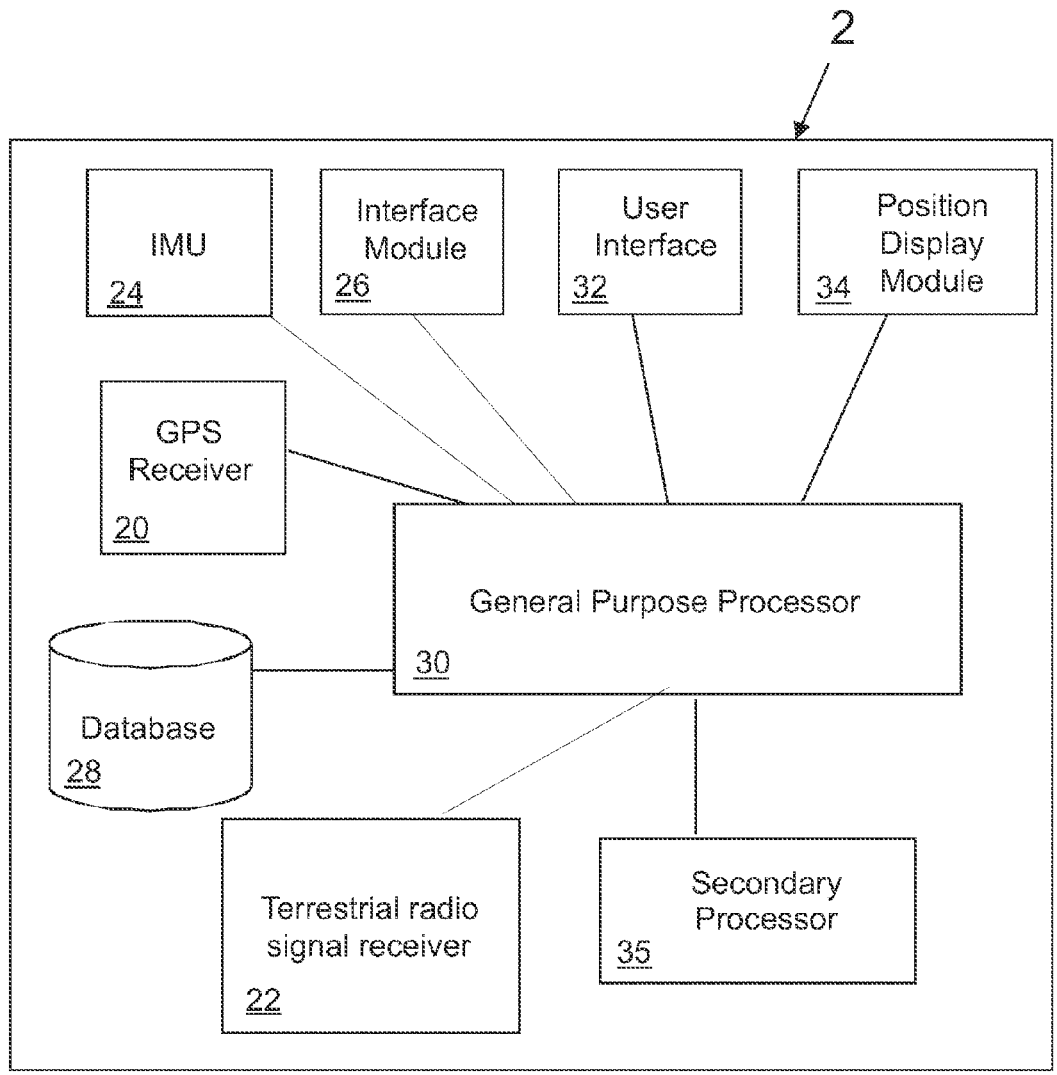
FIG. 1 shows a schematic diagram of a mobile receiver according to a first embodiment of the present invention.

Referring to FIG. 1 there is schematically shown a mobile receiver 2 according to a first embodiment of the present invention. The mobile receiver 2 comprises a primary positioning resource in the form of a GPS receiver 20, a terrestrial radio signal receiver 22, an Inertial Measurement Unit (IMU) 24, an interface module 26, a database 28, a general purpose processor 30, a user interface module 32, a position display module 34 and a secondary processor 35 in the form of a differential positioning module dedicated to performing differential timing and distance calculations. The mobile receiver 2 is also equipped with a clock incorporated as part of the processor 30.

The GPS receiver 20 and terrestrial receiver 22 collect data from respective GPS and terrestrial radio signals as is known in the art, and send their data to the processor 30. The processor 30 also receives data from the IMU 24, and optionally, the interface module 26. The interface module 26 may arranged to be connected to other devices, for example receivers arranged to receive radio signals other than those that can be received by the terrestrial radio signal receiver 22. In particular, the interface module 26 can allow the mobile receiver 2 to receive information from a reference base station 4—also as shown in FIG. 4.

Figure 4:
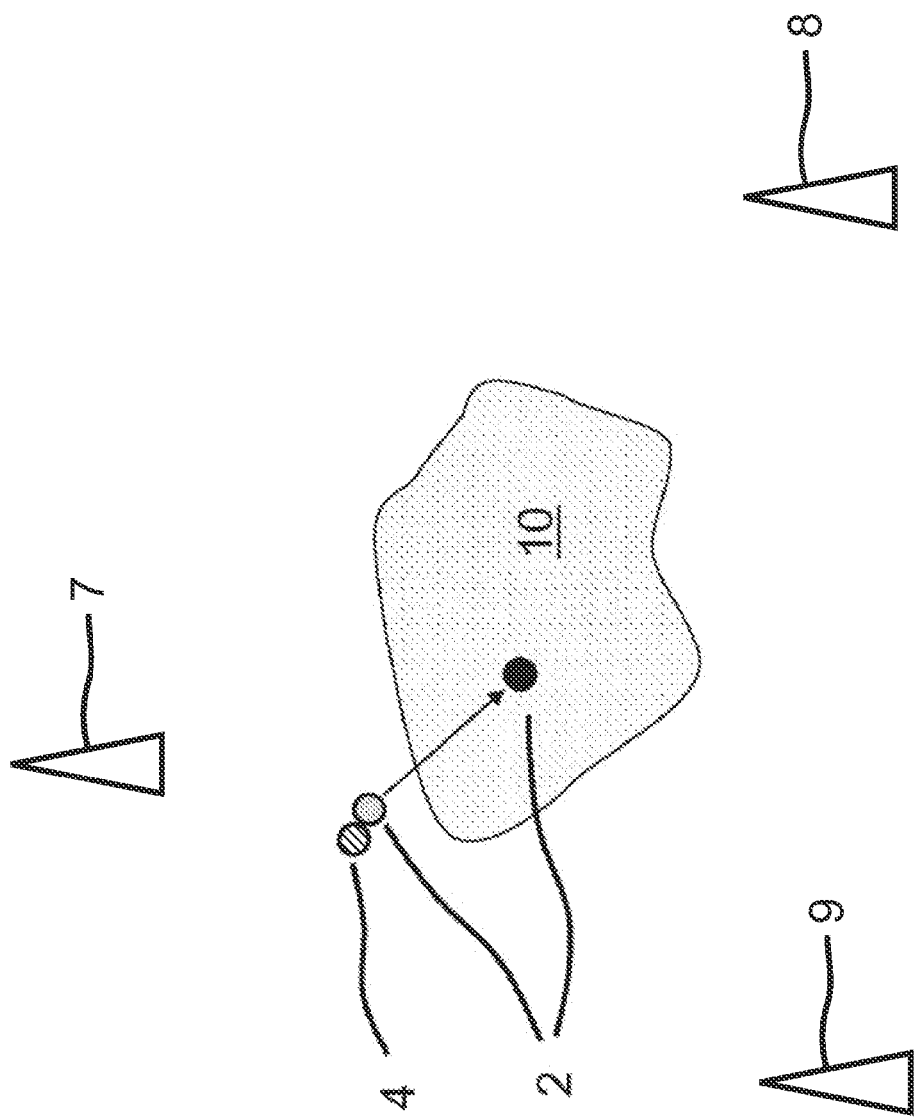
FIG. 4 is a schematic diagram showing a 2D example of the mobile receiver of FIG. 1 placed within an operational environment similar to those shown in FIGS. 2 and 3, and in which there are multiple terrestrial transmitters and an actual/real reference base station.

The terrestrial radio signal receiver 22 is arranged to receive radio signals with a frequency of between 3 MHz and 3000 MHz and so is able to receive radio signals transmitted from sources such as a GSM transmitter 7, a television UHF transmitter 8 and a FM radio station VHF transmitter 9 as shown in FIG. 4.

The terrestrial radio signal receiver 22 is arranged as a multi-channel system with approximately ten flexible channels with selectable antenna able to tune to any frequency within the above stated range and gather data over a radio signal capture window as will be described below. The terrestrial radio signal receiver 22 comprises one or more scanning channels per waveband constantly sweeping the band picking out the set of strongest signals and determining what they are, the modulation scheme, identification, etc and maintaining a priority list for the flexible channels based on signal strength, bandwidth, range, fundamental accuracy, location, etc.

The processor 30 is arranged to store the received data in the database 28. The processor 30 is also arranged to process the data received from input modules 20, 22, 24, 26, and store the resulting processed data in the database 28.

The database 28 also stores map images which are preloaded onto the database 28 and fetched by the processor 30 when needed.

Processed data comprises positional data which, together with the appropriate map images may be outputted by the processor to the position display module 34 which can then display an appropriate map to a user showing the location of the mobile receiver 2 on that map. The user interface 32 can also be used by the user to configure the processor 30, and so the operation of the mobile receiver 2.

The GPS receiver 20 receives GPS radio signals from a number of GPS satellites. Any radio signals that are received are fed to the processor 30 for processing and storage in the database 28. Using prior known techniques, the processor can use data from the GPS receiver 20 to determine the position of the mobile receiver 2, and display the position of the mobile receiver 2 to a user, for example overlaid on a suitable map image.

At the same time, the terrestrial radio signal receiver 22 may receive radio signals from a number of terrestrial radio signal transmitters. These radio signals are also fed to the processor 30.

In order to use the terrestrial radio signals for self-localisation, the mobile receiver 2, needs to have access to information about the location of the transmitters of the terrestrial radio signals received by the terrestrial receiver 22. This information may be preloaded in the database 28, or obtained via an external source (for example, by downloading the information, or by a user inputting this information via the user interface 32 after a survey of the area containing the transmitters).

The Inertial Measurement Unit (IMU) 24 also passes IMU information to the processor relating to the speed, acceleration and orientation of the mobile receiver 2.

Therefore, it can be seen that the mobile receiver 2 receives and logs information from a number of different sources relating to its state and the state of its environment.

The state information that is received by the mobile receiver 2 is stored in the database 28 and processed by the processor 30 as a number of different variables. For example, there may be variables associated with:

a) the distance between the mobile receiver 2 and each of the terrestrial radio signal transmitters 7, 8, 9;

b) the strength of the radio signal received by the mobile receiver 2 from each transmitter 7, 8, 9;

c) the timing offset between onboard clock of the mobile receiver 2 and the reference unit 4 as shown in FIG. 4;

d) the absolute position of the mobile receiver 2 on Earth as derived from the GPS receiver 20;

e) GPS time as derived from the GPS receiver 20; and f) speed, acceleration, orientation as derived from the inertial measurement unit 24;

as well as others, as will be apparent to a person skilled in the art.

Such input variables accessible by the mobile receiver 2 can be used to reinforce one another. For example, if the GPS receiver 20 provides successive updates about the position of the mobile receiver 2 whilst it is moving, then this can be used to determine the speed of the mobile receiver 2. The speed of the mobile receiver 2 may also be derived from the inertial measurement unit 24. As well as providing redundancy, it is possible for variables to be correlated with one another in a synergistic manner. Another example is the correlating a number of variables relating to the distance of the mobile receiver 2 to different geographically spaced transmitters (as shown in FIG. 4). These distance variables can thus be used synergistically to determine the position of the mobile receiver 2 using a trigonometric relationship. It will be understood that more complicated relationships between variables can be established and also used to minimise uncertainty about variables values.

In particular, variable values and associated variance values are stored as a state vector within the database 28. The processor 30 applies algorithms to the state vector so that variable values and variances values are modified in response to an update to linked variable values. Variables can be linked to one another algorithmically via their associations with parameters such as time, velocity and position. Thus, simply by receiving and logging additional information relating to one variable can improve the estimated values of another.

It will be understood that state information about the mobile receiver 2 and other entities such as transmitters can be incorporated into the state vector of the mobile receiver 2 to aid localisation.

Furthermore, as the state vector is updated, predictions can be made about the future states using past trends. For example, if the mobile receiver 2 is moving at a constant velocity, it can be assumed that it will continue to do so unless contradicting data is received. Using this method, erroneous data (from example, resulting from radio signal interference) can be discarded. The predictions can be made using a Bayesian estimator such as a Kalman filter, loaded with assumptions and/or models about the behaviour of the mobile receiver 2 and other entities.

A specific example of the mobile receiver in operation will now be given.

Figure 2:
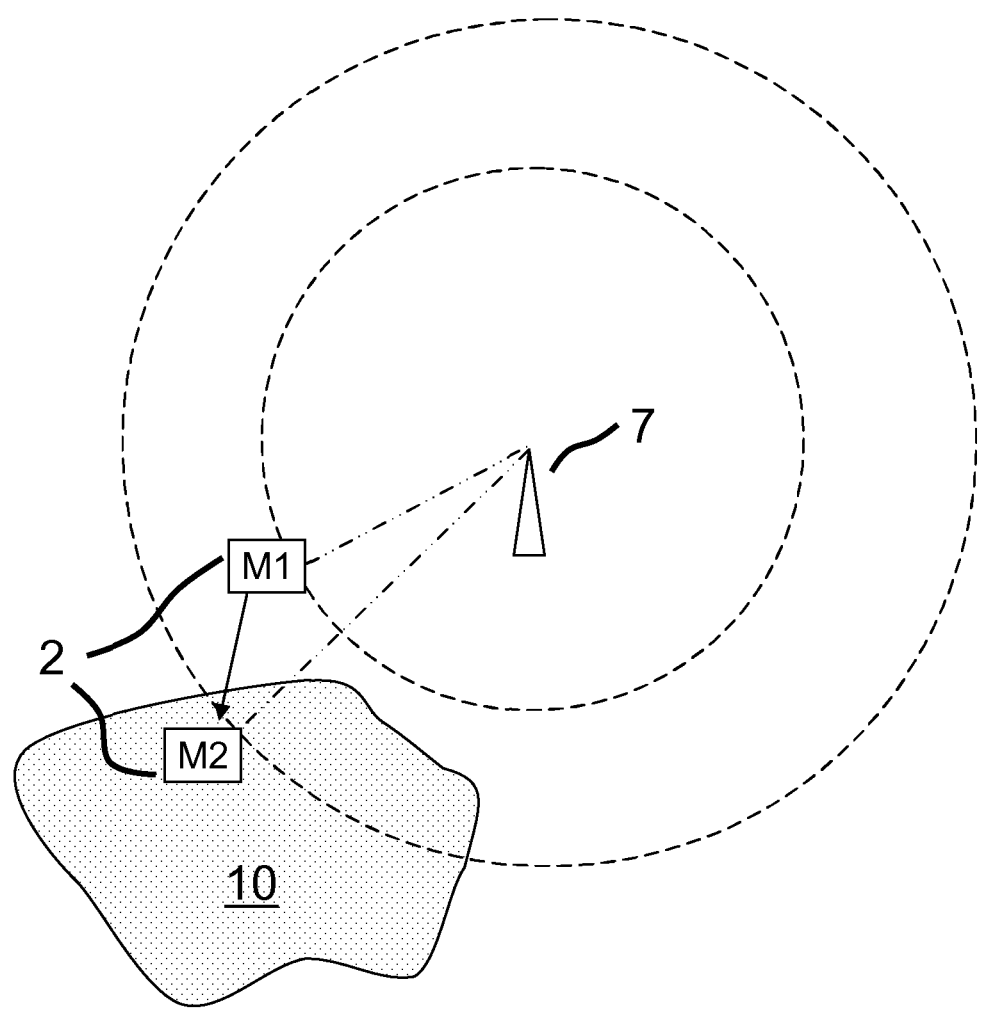
FIG. 2 is a schematic diagram showing a simplified 2D example of the mobile receiver of FIG. 1 placed within an operational environment in which a virtual positioning reference is established relative to a single terrestrial transmitter prior to the mobile receiver entering into an area in which a primary positioning resource of the mobile receiver is rendered ineffective.

Referring to FIG. 2, there is shown a simplified 2D example in which the mobile unit 2 is arranged to establish a virtual positioning reference at position M1 prior to entering a region 10 in which its primary positioning resource—in the form of the GPS receiver 20—is rendered ineffective. The mobile receiver 2 can then use the established virtual positioning reference to aid localisation using differential radio positioning relative to the single GSM transmitter 7.

At the first position M1 of the receiver 2, the receiver is able to determine its position using the GPS receiver 20. Whilst at that position, the receiver 2 also receives radio signals originating from the terrestrial GSM radio signal transmitter 7. The nature of this transmitter 7 is such that the radio signals that it transmits multiple instances of the same code word. These are usually used by mobile telephone handsets to be able to synchronise with the GSM transmitter. However, in the present example, these code words are used by the mobile receiver 2 for the purpose of radio localisation.

In particular, the mobile receiver 2 opens a radio signal capture window. In this capture window, the code words from the radio signal transmitter 7 manifest themselves as a regularly repeating series of waveforms that are substantially unique to the transmitter 7. The mobile receiver 2 is thus able to confidently associate those received waveforms with the GSM radio signal transmitter 7, and also determine the repeat rate of those code words.

In subsequent radio signal capture windows opened by the mobile receiver 2, assuming that the mobile receiver 2 has not moved any distance away from the GSM radio signal transmitter 7, the waveforms representing those code words will appear at predictable locations within the capture window—in other words at predictable times.

However, if the mobile receiver 2 has moved towards the GSM transmitter 7, the occurrence of the code words will be shifted earlier in time, and if the mobile receiver 2 has moved away from the GSM transmitter 7, the occurrence of the code words will be shifted later in time. The amount the code words have shifted in time corresponds to the distance traveled by the mobile receiver 2 relative to the GSM transmitter 7.

In any case, when the mobile receiver 2 is at the first position, the virtual positioning reference is established by logging in the database 28 the position as determined by the GPS receiver 20 against the time at which a first instance of a code word is received by the transmitter 7. The time at which the first instance of the code word is received by the mobile receiver 2 is determined by the local clock of processor 30 of the mobile receiver 2.

Once the virtual positioning reference is established, the mobile receiver 2 is then able to enter into the region 10 to position M2 in which GPS is unavailable (for example, under a dense canopy) and self-localise using the transmitter 7. The local clock of the mobile receiver 2 is run during movement of the mobile receiver 2 between the first position M1 and the second position M2. Once the mobile receiver 2 is at the second position M2, a second radio signal capture window is opened.

Assuming that the mobile receiver 2 is within range of the GSM transmitter 7, code words originating from the GSM transmitter 7 will be visible in the second opened radio signal capture window. In particular, a second instance of a code word will be present within the radio signal capture window at a give time period elapsed from when the first instance of the code word was received. This is again measured by the clock local to the mobile receiver 2. The time difference between when the first instance of the code word was received and when the second instance of the code word is received relates to the time elapsed during movement of the mobile receiver 2 from the first position M1 to the second position M2 as well as the shift in the position of the code word as a result of the change in relative distance from the transmitter 7. The virtual positioning reference is used to determine the shift in position of the code word resulting only from the change in distance of the mobile receiver 2 relative to the transmitter 7.

This can be done because, as stated, the code words are repeated at a regular and therefore predictable repeat rate. Therefore the mobile receiver 2 can predict when a second instance of a code word would have been received by the virtual positioning reference—essentially acting as a virtual reference base station. This will be an integer multiple of the code word repeat rate added onto the time at which the first instance of the code word was received. It will be understood that the value of the integer multiplier can be determined in relation to the time elapsed since the first instance of the code word was received by the mobile receiver 2.

In any case, the time at which the virtual positioning reference is predicted to receive the second instance of the code word is differenced from the time when the second instance of the code word is actually received by the mobile receiver 2. The remaining time value is that relating to relative movement between the mobile receiver 2 and the transmitter 7. This is represented schematically in FIG. 2 as the difference between the radius of the smaller dashed circle (i.e. the distance of the mobile receiver 2 at the first position M1 away from the transmitter 7) and the radius of the larger dashed circle (i.e. the new distance of the mobile receiver 2 at the second position M2 away from the transmitter 7). The difference in time as a result of the change in distance of the mobile receiver 2 is simply factored with the known speed of the radio wave to determine the distance travelled relative to the GSM transmitter (and therefore the new distance away from the GSM transmitter 7).

The differential calculations are processed directly by the dedicated differential positioning module 35, leaving the main general purpose processor 30 free for other processing tasks. As the differential positioning module 35 is specifically set up to process these differential calculations, the overall computation and power consumption of the mobile receiver 2 is reduced more than if the general purpose processor 30 were to have to process these differential calculations. Thus, the presence of the differential positioning module 35 means that the positioning determination can be advantageously implemented in hardware rather than in software to be executed on the processor 30. As will be described in more detail below in relation to FIG. 4, the same dedicated differential positioning module 35 can be used to perform differential calculations on data received by an actual reference base station 4 as well as a virtual positioning reference.

In the simplified 2D example shown in FIG. 2, there is only one transmitter 7 shown. However, in practice it is likely that multiple transmitters will be required to determine the exact location of the mobile receiver 2 through trigonometric calculations as are known in the art. However, it is not strictly necessary for there to be more than one transmitter assuming the mobile receiver has access to other input variables. For example, if the mobile receiver 2 has received information from the Inertial Measurement Unit (IMU) 24 that it has moved in a straight line at a known bearing from position M1 to M2, then in fact only a single transmitter is needed to self-localise.

Figure 3:
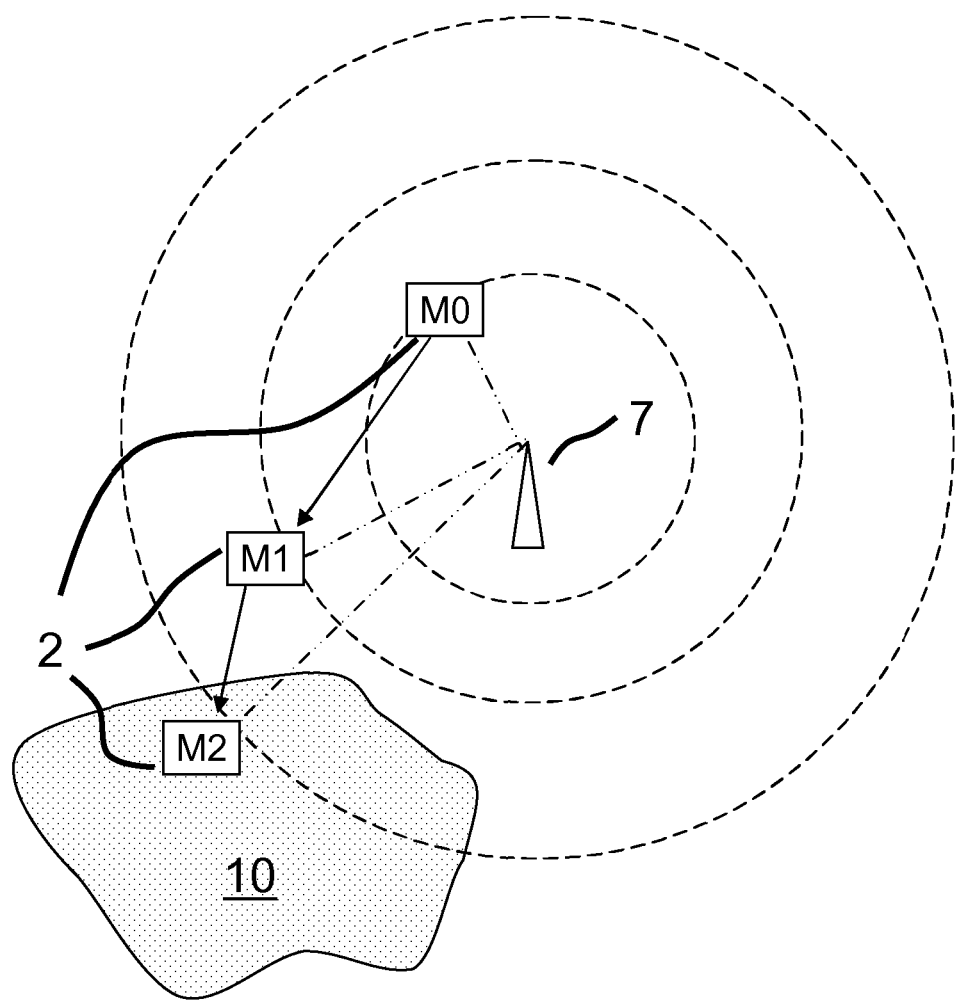
FIG. 3 is a schematic diagram showing the same simplified 2D example of FIG. 2, but where two virtual positioning references are established prior to the mobile receiver entering into the area in which the primary positioning resource of the mobile receiver is rendered ineffective.

Referring to FIG. 3, the mobile receiver 2 can make use of the GSM transmitter 7 to self-localise in a more robust manner than as shown in FIG. 2 by establishing additional virtual positioning references at spaced locations M0 and M1. By doing so, location-influenced radio signal errors such as multipath errors can be mitigated. For example, if location M1 is near a tall building, radio wave reflections from the building may affect the accurate determination of the location of the mobile receiver 2 (via GPS) and/or the exact time at which code words from the GSM transmitter 7 are actually received. If an additional virtual positioning reference is established at position M0, then erroneous virtual positioning reference data can be minimised. With further virtual positioning references, these errors can even be identified and eliminated.

Referring to FIG. 4, the mobile receiver 2 is shown in an environment in which there are multiple terrestrial radio transmitters—the GSM transmitter 7, the television UHF transmitter 8 and the FM radio station VHF transmitter 9. These transmitters are geographically spaced around a region 10 in which the mobile receiver 2 is unable to localise using GPS. The approximate frequency ranges of these transmitters are as follows:

| Transmitter | Approximate frequency range |
| --- | --- |
| GSM transmitter 7 | 850 MHz-960 MHz and 1805 MHz-1880 MHz (UK bands) |
| TV UHF transmitter 8 | 400 MHz to 850 MHz |
| VHF transmitter 9 | 88 MHz to 108 MHz |

Thus, it can be seen that the transmitters are of different types and frequencies, and also have different code words and code word repeat rates. Thus, when establishing the virtual positioning reference in respect of each of these transmitters, the opening of a radio signal capture window will have to be for a period in which guarantees the mobile receiver 2 to have received a code word for each transmitter. This can be done by analysing the code word repeat rate of each of the transmitters 7, 8, 9, determining the slowest repeat rate out of the three transmitters, and then setting the period for which the radio signal capture window to be just larger than this slowest repeat period. Since opening a radio signal capture window can involve receiving, storing and processing a high level of uncompressed radio signal data, it is advantageous not to exceed this limit so as to minimise storage usage of the database 28 local to the mobile receiver 2.

Alternatively, given a suitably-agile radio receiver, the timings generated by the virtual reference receiver can be used to predict when each transmitter's code word is expected to arrive at the receiver, and so the receiver can be programmed to capture small amounts of data on each radio band in the required hopping sequence. This reduces the amount of superfluous data captured by using a fixed length capture window across all bands.

Also shown in FIG. 4 is an actual reference base station 4. As mentioned, the same dedicated differential positioning module 35 can be used to perform differential calculations on data received by this actual reference base station 4 as well as the virtual positioning references established by the mobile receiver 2. In particular, instead of the mobile receiver 2 predicting when a code word would be received at a virtual positioning reference, the reference base station 4 instead transmits to the mobile receiver 2 when it actually does receive a particular instance of a code word. This can be fed through the differential positioning module 35 of the mobile receiver 2 in the same way as data logged at the mobile receiver 2 in respect of the virtual positioning reference. This relies on synchronicity between the mobile receiver 2 and the reference base station 4.

In summary, the method described above of establishing a virtual positioning reference takes advantage of the fact that most modern opportunistic digital signal sources (e.g cellular, DAB, DVB, etc) use highly stable frequency/timing references. Many of such opportunistic radio signal sources often have a minimum timing stability specification that must be adhered to. As a result of this the transmitter clock offset a values remain sufficiently constant for long periods of time (many hours to many days, and in some circumstances, over a week). Thus instead of calculating, storing and even sharing transmitter clock offset values a as is suffered by the prior art, merely the raw timing measurements and location of where the measurements are taken need be stored.

Figure 5:
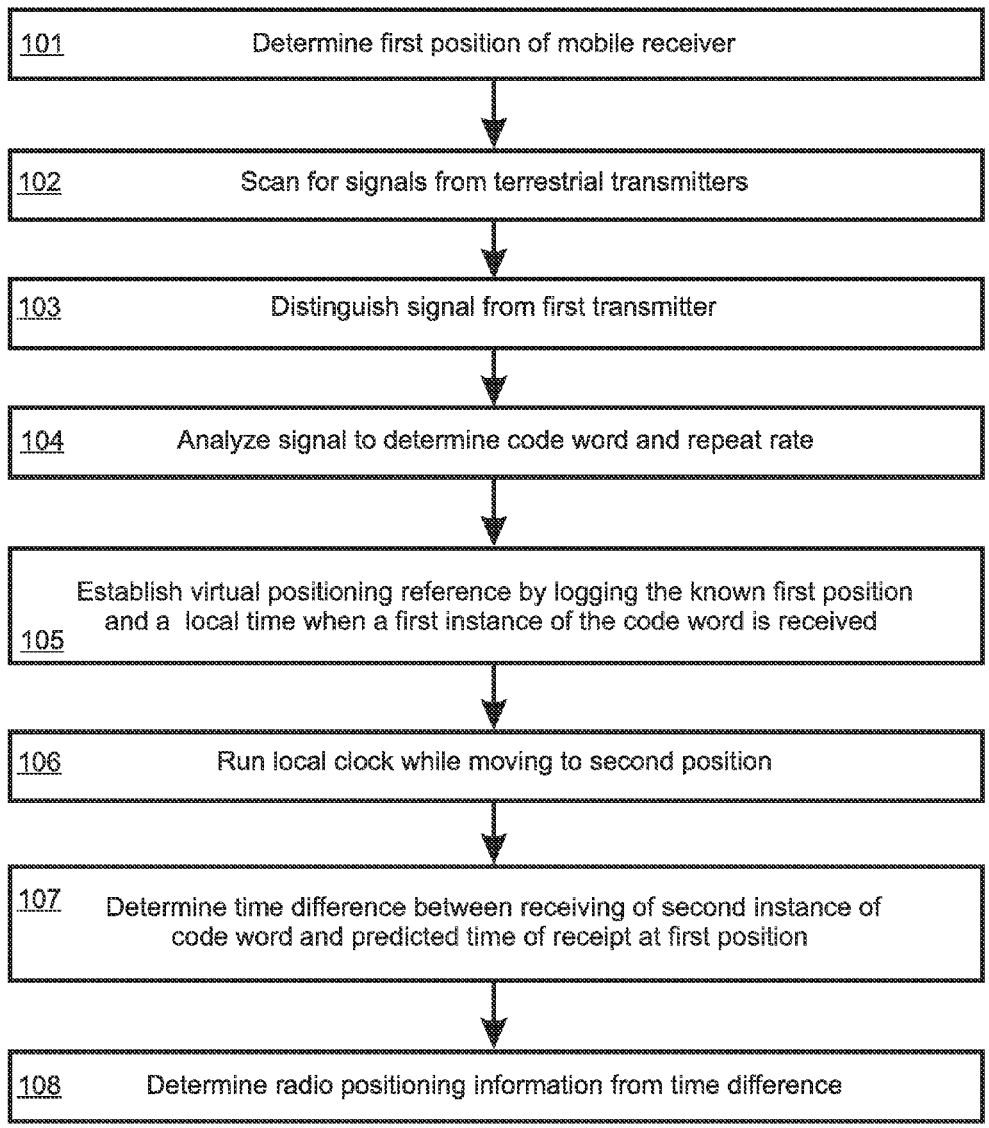
FIG. 5 is a flow diagram illustrating an embodiment of the present invention.

With reference to FIG. 5, this more elegant method reduces the computational burden of calculating the transmitter clock offset values a. In particular, the mobile device 2 can start from a known location 101 and scan for signals from terrestrial transmitters 102. It can then distinguish a signal from a stable, stationary terrestrial transmitter having a known location 103 and analyze the signal to determine a code word transmitted by the transmitter and its repeat rate 104. After that, the mobile device 2 can log the timing signals 105 originating from a stable, stationary terrestrial transmitter 7. The mobile navigation device can then move to a second unknown location 106 where its primary positioning system is rendered ineffective (e.g. by electronic interference, terrain, indoor activity etc)—but it is still possible to receive the timing signals.

When the mobile receiver 2 moves to a new location and GPS is denied 105, the opportunistic reference timing measurements are updated according to the elapsed time of the local clock 106 to provide an estimate of the opportunistic timing measure that would be measured at that given moment at the reference position if the mobile receiver was still there 107. Radio positioning information can then be determined from this time difference 108.

The invention claimed is:

1. A mobile receiver arranged to determine radio positioning information, said mobile receiver comprising:
   a primary positioning resource configured for determining a position of the mobile receiver as being at a first receiver position;
   a local clock;
   a terrestrial receiver configured to scan for signals transmitted by terrestrial transmitters of a plurality of different transmitter types, said plurality of different transmitter types including at least one type of transmitter that transmits signals of opportunity that are not intended for navigational use;
   a processor configured for distinguishing and identifying from among said signals a first signal transmitted by a first terrestrial transmitter having a known location, and for analyzing said first signal to determine a distinguishable, predictably repeated first code word and a repeat rate thereof,
   said processor being further configured for establishing a first virtual positioning reference by logging the first receiver position together with a local time measured relative to said local clock at which a first instance of the first code word is received by the mobile receiver; and
   a differential positioning unit configured for using an output of the local clock to determine a time difference between when the first virtual positioning reference is predicted to receive a second instance of the first code word and when the mobile receiver actually receives the second instance of the first code word when at a second receiver position, thereby determining radio positioning information pertaining to the second receiver position of the mobile receiver and
   a display device configured to display the radio positioning information to a user.

2. A mobile receiver according to claim 1, comprising an inertial measurement unit configured to provide to the processor inertial measurement information pertaining to movement of the mobile receiver, said processor being further configured to determine a location of the second receiver position according to said radio positioning information and said inertial measurement information.

3. A method for obtaining radio positioning information relevant to a position of a mobile receiver, said method comprising:
   determining the position of the mobile receiver as being at a first known position;
   when the mobile receiver is at said first known position:
      scanning for signals from terrestrial transmitters of a plurality of different transmitter types, said plurality of different transmitter types including at least one type of transmitter that transmits signals of opportunity that are not intended for navigational use;
      distinguishing from among said signals a first signal transmitted by a first terrestrial transmitter having a known first transmitter location;
      analyzing said first signal to identify a distinguishable, predictably repeated first code word and a repeat rate thereof; and
      establishing a virtual positioning reference by logging the first known position together with a local time at which a first instance of the predictably repeated first code word is received by the mobile receiver from the first terrestrial transmitter, the local time being measured relative to a clock that is local to the mobile receiver;
   running the local clock during movement of the mobile receiver from the first known position to a second position, said second position being unknown; and
   when the mobile receiver is at the second position, using the local clock to determine a first time difference between when the virtual positioning reference is predicted to receive a second instance of the first code word and when the mobile receiver actually receives the second instance of the first code word, and thereby determining radio positioning information relevant to the second position of the mobile receiver and
   displaying the radio positioning information to a user.

4. A method according to claim 3, comprising deriving the position of the mobile receiver at the first known position via a primary positioning resource local to the mobile receiver, the second position being at a position at which the primary positioning resource of the mobile receiver is rendered ineffective.

5. A method according to claim 3, comprising calculating the time difference using a differential positioning module local to the mobile receiver.

6. A method according to claim 3, comprising establishing a plurality of virtual positioning references at known locations that are geographically spaced apart from one another.

7. A method according to claim 3, comprising:
   identifying a distinguishable, predictably repeated second code word transmitted by a second terrestrial transmitter having a known second transmitter location that is geometrically spaced apart from the known first transmitter location, and a repeat rate thereof;
   when the mobile receiver is at the first known position, logging a local time at which a first instance of the second code word is received by the mobile receiver;

when the mobile receiver is at the second position, using the local clock to determine a second time difference between when the virtual positioning reference is predicted to receive a second instance of the second code word and when the mobile receiver actually receives the second instance of the second code word; and synergistically determining the location of the second position from the first time difference and the second time difference using a trigonometric relationship.

8. A method according to claim 7, comprising capturing radio signal data using a radio signal capture window a length of which is limited to substantially a period of time of a most slowly repeating code word.

9. A method according to claim 3, comprising opening a radio signal capture window at substantially the time when the virtual positioning reference is predicted to receive the second instance of the first code word for substantially a time period required to receive the second code word.

10. A method according to claim 3, comprising estimating the second position of the mobile receiver by applying a Bayesian estimation filter to the radio positioning information.

11. A method according to claim 10, wherein the Bayesian estimation filter comprises a Kalman filter or a particle filter.

12. A method according to claim 10, wherein the application of a Bayesian estimation filter comprises loading the filter with at least one of:
error models associated with the first terrestrial transmitter;
error models associated with the mobile receiver; and
information from an inertial measurement unit about the movement of the mobile receiver.

13. The method of claim 3, comprising determining a location of the second position by combining the radio positioning information with inertial measurement information obtained from an inertial measurement unit.

14. A method for obtaining radio positioning information relevant to a position of a mobile receiver, said method comprising:
determining the position of the mobile receiver as being at a first known position;
when the mobile receiver is at said first known position:
scanning for signals from terrestrial transmitters of a plurality of different transmitter types, said plurality of different transmitter types including at least one type of transmitter that transmits signals of opportunity that are not intended for navigational use;
distinguishing from among said signals a first signal transmitted by a first terrestrial transmitter having a known first transmitter location;
analyzing said first signal to identify a distinguishable, predictably repeated first code word and a repeat rate thereof; and
establishing a virtual positioning reference by logging the first known position together with a local time at which a first instance of the predictably repeated first code word is received by the mobile receiver from the first terrestrial transmitter, the local time being measured relative to a clock that is local to the mobile receiver;

running the local clock during movement of the mobile receiver from the first known position to a second position, said second position being unknown; and when the mobile receiver is at the second position, using the local clock to determine a first time difference between when the virtual positioning reference is predicted to receive a second instance of the first code word and when the mobile receiver actually receives the second instance of the first code word, and thereby determining radio positioning information relevant to the second position of the mobile receiver, and displaying the radio positioning information to a user; the method further comprising applying the equation:

$$c(t_{New}-t_{ref}) = |r_{New}-b| - |r_{ref}-b| + (\alpha_{New}-\alpha_{ref}) + (\epsilon_{New}-\epsilon_{ref})$$

where:
c is the known speed of the radio waves;
$t_{New}$ represents the time, measured at the mobile receiver using the local clock, at which the second instance of the first code word is received by the mobile receiver at the second position;
$t_{ref}$ represents the time, measured at the mobile receiver using the local clock, at which the virtual positioning reference is predicted to receive the second instance of the first code word;
$r_{New}$ is the second position of the mobile receiver;
b is the known first transmitter location;
$r_{ref}$ is the first position of the mobile receiver;
$\alpha_{New}$ and $\alpha_{ref}$ represent offsets of the transmitter clock at $t_{New}$ and $t_{ref}$ respectively;
$\epsilon_{ref}$ represents an error of the local clock when the reference measurements ($t_{ref}$) was established; and
$\epsilon_{New}$ represents an error of the local clock when the reference measurement ($t_{New}$) was established.

15. A method according to claim 14, comprising taking a difference between a plurality of calculations of $c(t_{New}-t_{ref})$ made using the equation formulated from pairs of measurements pertaining to a plurality of different terrestrial transmitters having known locations.

16. A method according to claim 14, comprising removing local clock errors by receiving transmissions from two different terrestrial transmitters 'A' and 'B' and by applying the equation:

$$c(t^A_{new}-t^A_{ref}) - c(t^B_{new}-t^B_{ref}) = (|r_{new}-b^A| - |r_{ref}-b^A| + (\epsilon_{new}-\epsilon_{ref})) - (|r_{new}-b^B| - |r_{ref}-b^B| + (\epsilon_{new}-\epsilon_{ref})).$$

* * * * *